Figure 6:
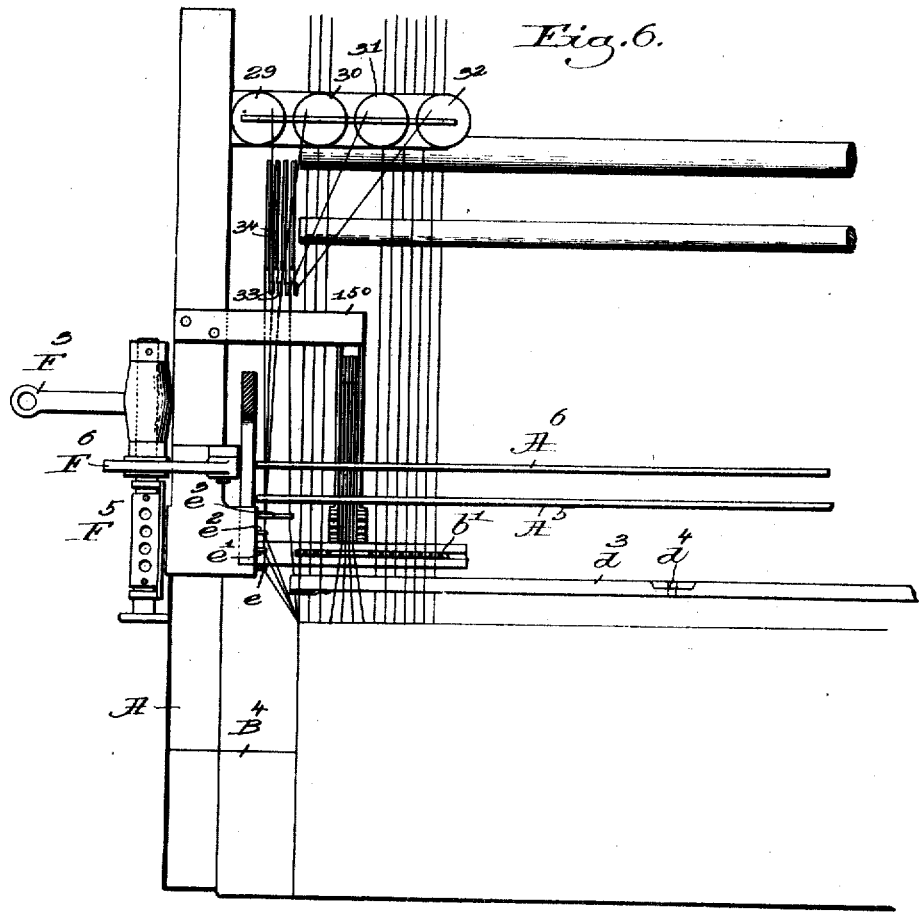

F. TAVELLA.
LOOM.
APPLICATION FILED JUNE 29, 1907.
922,357.
Patented May 18, 1909.
7 SHEETS—SHEET 1.
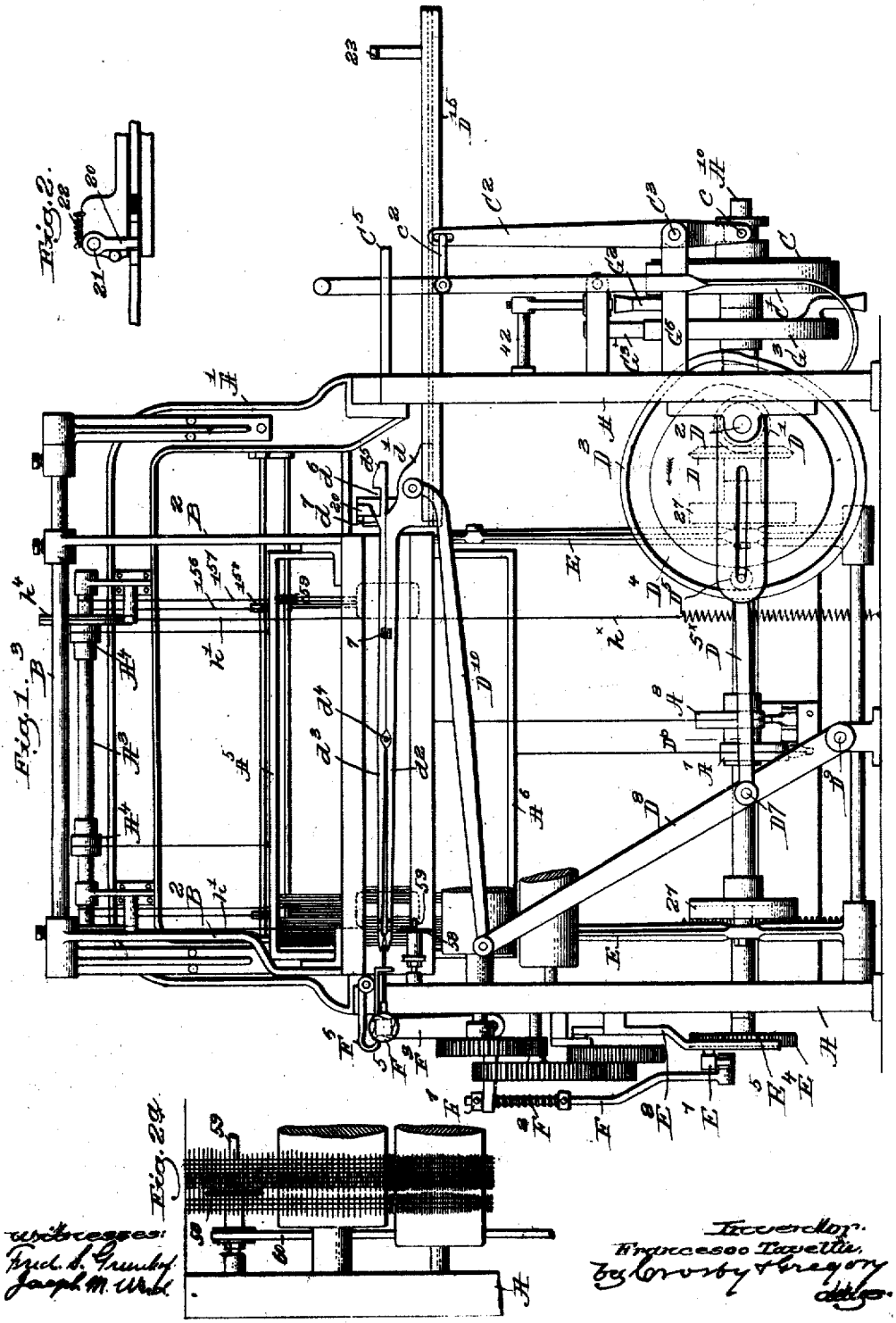

F. TAVELLA.
LOOM.
APPLICATION FILED JUNE 29, 1907.
922,357.
Patented May 18, 1909.
7 SHEETS—SHEET 2.
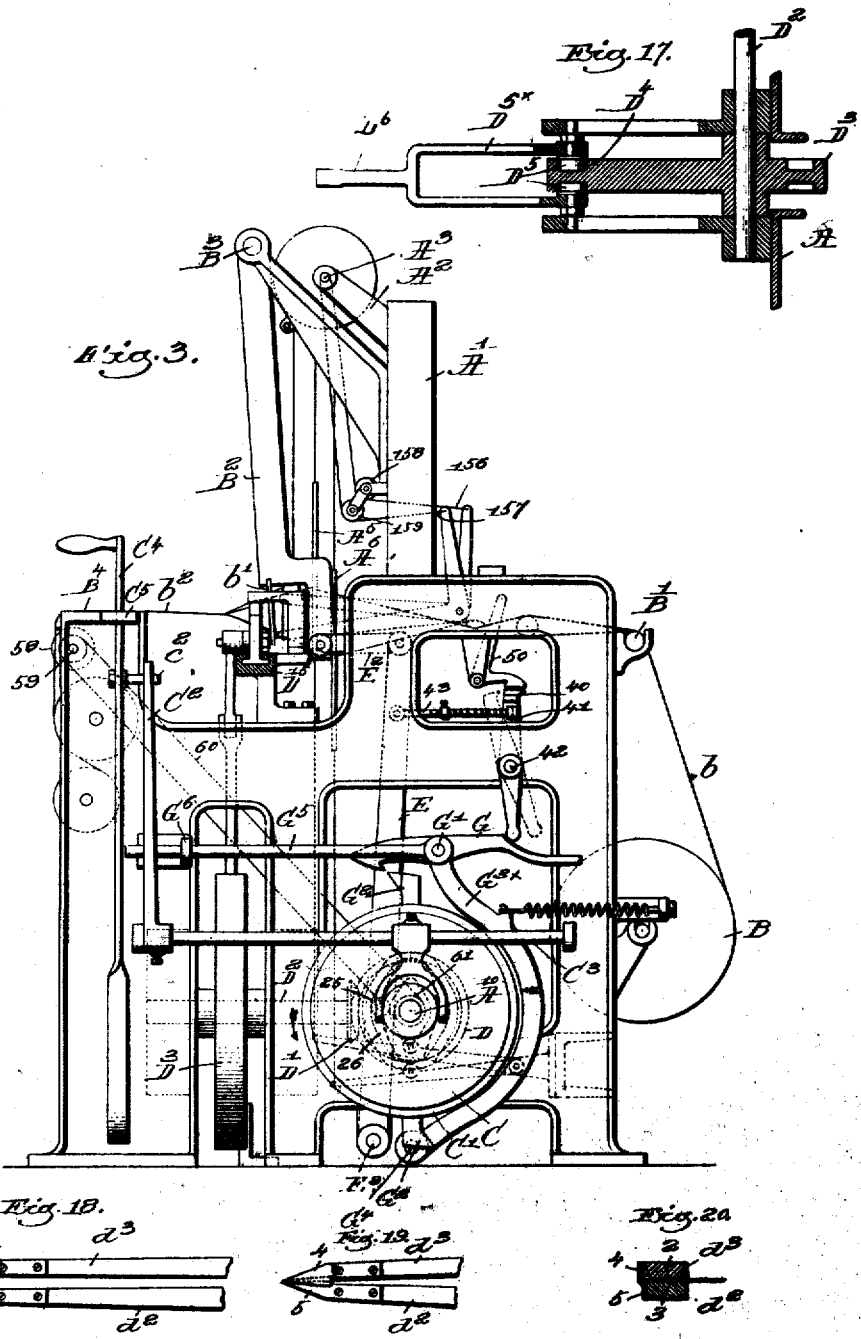

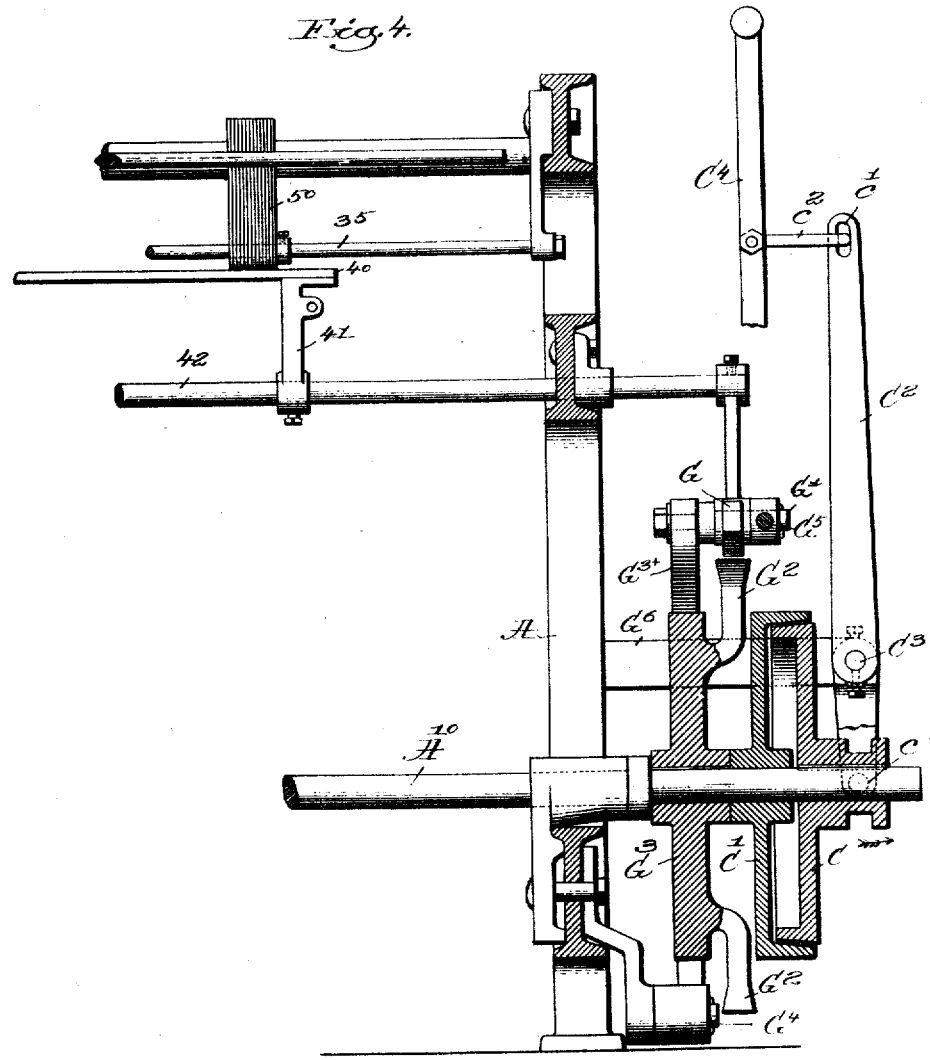

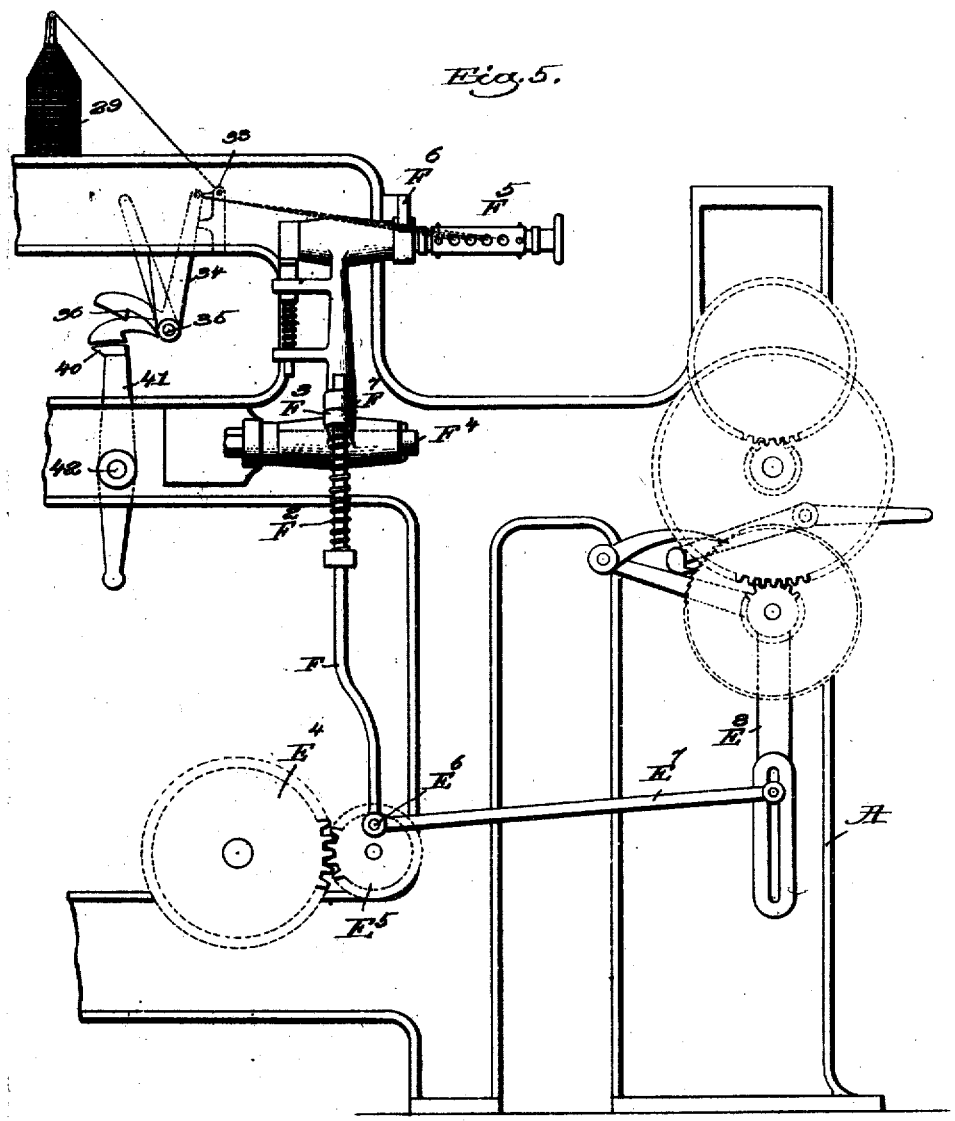

F. TAVELLA.
LOOM.
APPLICATION FILED JUNE 29, 1907.

922,357.

Patented May 18, 1909.
7 SHEETS—SHEET 5.

Witnesses:

Inventor
Francesco Tavella,
by Crosby & Gregory
attys.

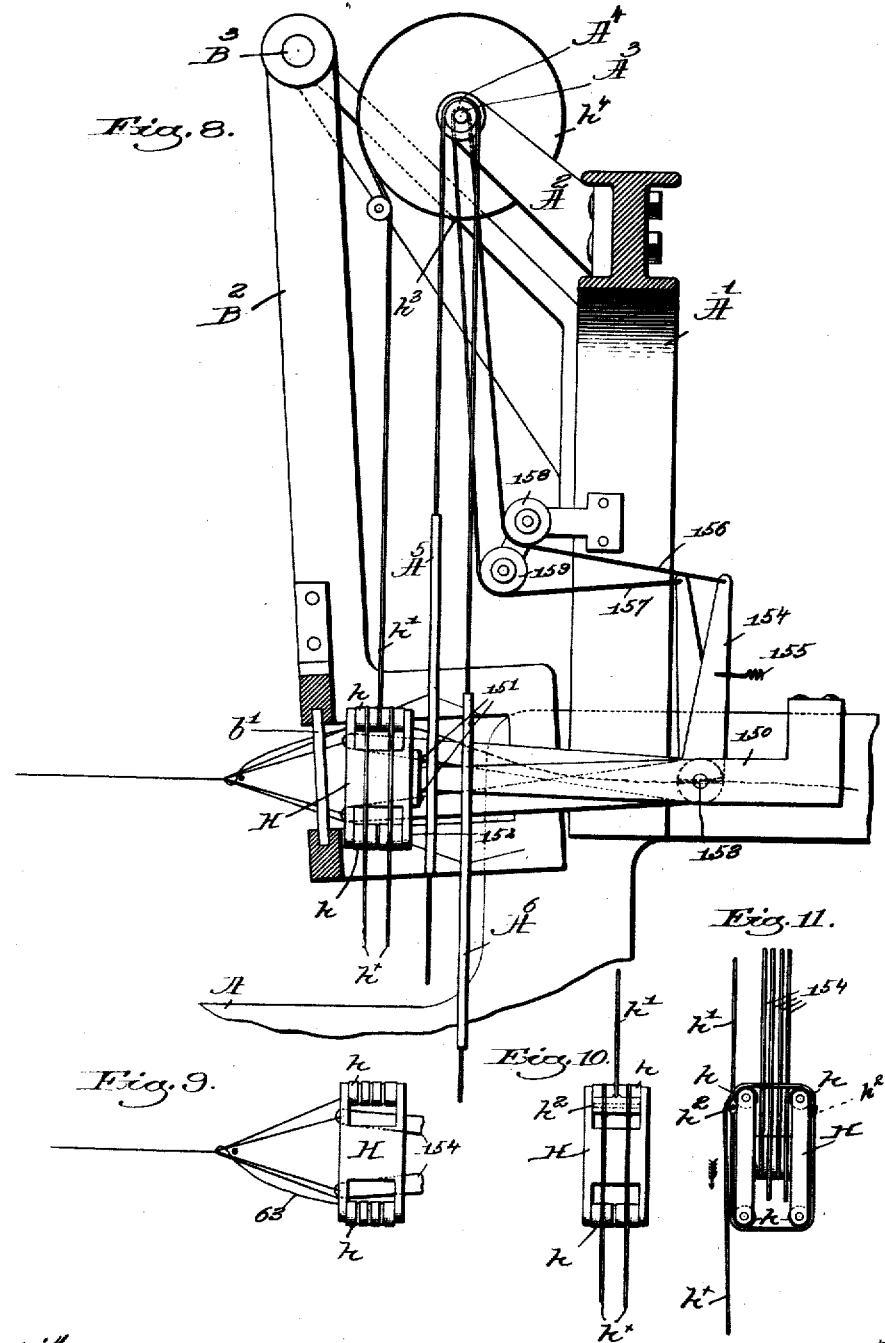

F. TAVELLA.
LOOM.
APPLICATION FILED JUNE 29, 1907.

922,357.

Patented May 18, 1909.
7 SHEETS—SHEET 7.

UNITED STATES PATENT OFFICE.

FRANCESCO TAVELLA, OF VARAZZE, ITALY, ASSIGNOR OF ONE-THIRD TO HECTOR CHIARIGLIONE, AND ONE-THIRD TO FRANCESCO BADANO, BOTH OF PUEBLO, COLORADO.

LOOM.

No. 922,357.  Specification of Letters Patent.  Patented May 18, 1909.

Application filed June 29, 1907. Serial No. 381,388.

*To all whom it may concern:*

Be it known that I, FRANCESCO TAVELLA, a subject of the King of Italy, and a resident of Varazze, Italy, have invented an Improvement in Looms, of which the following description, in connection with the accompanying drawing, is a specification, like characters on the drawing representing like parts.

This invention has for its object to improve that class of loom wherein a weft is laid in a shed as a single crossing instead of double as when a needle with an eye is employed to insert a weft in a shed. In accordance with my invention, I locate outside one of the selvage warps constituting one edge of the fabric a weft presenter or presenters under the control of a suitable pattern surface, and outside the opposite selvage of the fabric to be woven I locate a weft-carrier. The weft-carrier occupies a position normally at the opposite selvage from that where is located the weft presenters. The weft-carrier herein shown is of novel construction and has combined with it means whereby the weft-carrier is opened after the same has been projected through the shed, at which time it grasps a weft extended from a weft presenter then in its operative position and connected temporarily with one of the selvages near it, and the weft-carrier having been opened, to embrace a weft, is automatically closed on the weft at the same time the cutters of the weft-carrier sever the weft between the carrier and the selvage. This done, the weft-carrier is retracted, drawing with it the weft from the hole in the rigid weft presenter, and as the weft-carrier completes its backward stroke and is withdrawn fully from the shed the reed beats the single weft into the fell and immediately as or after the weft is beaten into the shed the weft-carrier is opened to release the free end of the weft just drawn into the shed.

I have provided novel means for actuating the weft-carrier that it may be projected through the shed and withdrawn therefrom, said means including an eccentric having a cam groove, the groove receiving a roller of a link connected with a lever pivoted within the loom frame, the upper end of said lever being attached to a portion of the weft-carrier. This construction brings the working parts of the loom in more compact shape and avoids imparting an additional movement to the fulcrum of the lever connected with and for operating the carrier. The weft-carrier is reciprocated on a track or guideway fixed with relation to the loom side rather than on a track forming part of the lay or other device carrying the reed.

In my invention I dispense with usual nippers to which the weft-carrier presents the weft after the same has been carried through the shed, said nippers holding the weft while the carrier is retracted, it having given up the weft, and I also dispense with the employment of any auxiliary device at the opposite selvage to control the cut end of the weft prior to the action of the reed in beating the weft into the fell.

In my invention the upper member of the weft-carrier is of a length equal to or in excess of the width of the cloth being woven, so that the said upper member may be acted upon when its weft-holding end has been projected through the shed to open the same that it may grasp a weft, and also so that it may be opened at the extremity of its back or withdrawal stroke from the shed that the weft drawn through the shed by the weft-carrier may be released as or after the weft has been beaten into the fell. By mounting the weft-carrier on a track sustained by the loom frame rather than by the lay, and by dispensing with the nipper referred to for holding the free end of the weft carried through the shed while the weft-carrier is retracted, the mechanism of the loom is greatly simplified and it may be run at a faster speed and the momentum to be overcome in the movement of the reed-carrier is greatly reduced.

Figure 7:
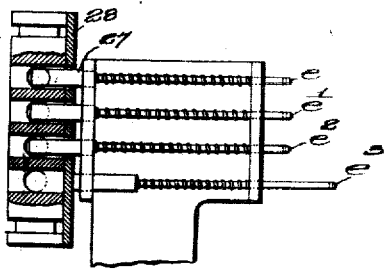
Figure 12:
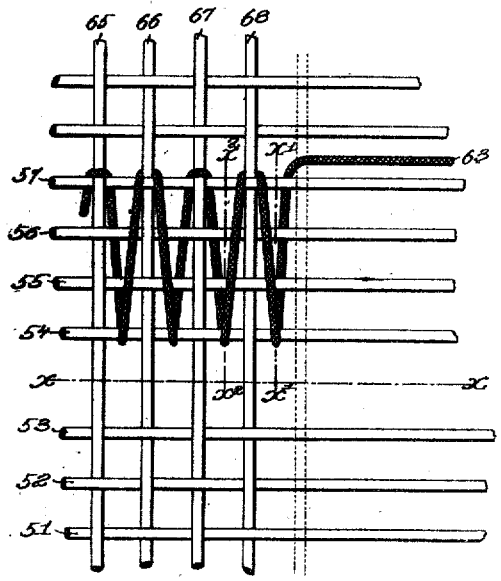
Figure 15:
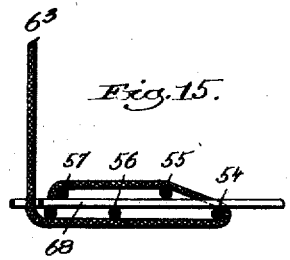
Figure 16:
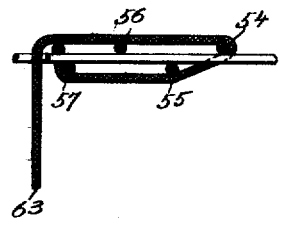
Figure 13:
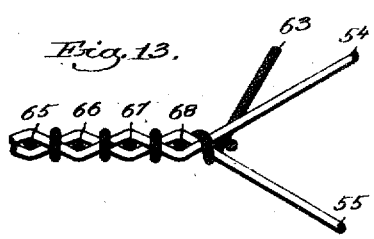
Figure 14:
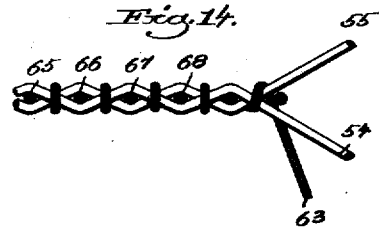

Figure 1 in front elevation shows a sufficient portion of a loom with my improvements added to enable my invention to be understood; Fig. 2 is a detail of a dog to be described; Fig. 2ª a detail in plan view of the fabric slitting means; Fig. 3 is a right hand end view of the loom shown in Fig. 1; Fig. 4 is an enlarged detail showing the driving mechanism and part of the warp stop mechanism; Fig. 5 is a side elevation in detail showing the weft stop mechanism and the pattern surface for controlling the weft-presenting means, and a weft bobbin; Fig. 6 is a detail plan view showing the weft bobbins, the means for controlling the same that they may be presented to the weft-carrier, and part of the selvage-forming means, the figure also showing the part of the pattern surface for putting into or out of operative position either of the weft presenters; Fig. 7 is a detail of the weft-presenting means, one of them being in its operative position; Fig. 8 is an enlarged detail of part of the selvage mechanism; Figs. 9, 10 and 11 are details showing parts of different views of the doup heddle mechanism; Fig. 12 is an enlarged detail in plan showing the warp and weft and some selvage threads; Fig. 13 a section to the right of the dotted line $x$, Fig. 12, showing the completed selvage, the thread 63 being up and about to be lowered; Fig. 14 is another view of the completed selvage looking at the same at its edge, the warp thread 63 being down and about to be raised; Fig. 15 is a section in the line $x'$; Fig. 16 is a section in the line $x^2$; Fig. 17 is a detail showing the carrier-actuating eccentric and the slide and link connecting the same with the lever for moving the weft-carrier; Fig. 18 shows enlarged the acting end of the weft-carrier open; Fig. 19 shows the same closed; Fig. 20 is a section in the line $x^4$, Fig. 19, showing the cutter as cutting the weft.

The framework A of the loom has an upright or top portion A' provided with brackets $A^2$ that sustain a shaft $A^3$ provided with pulleys $A^4$ with which are connected straps attached to the upper side of any usual harness frames $A^5$, $A^6$, said harness frames having straps connected with their lower ends that are in turn connected with any usual treadles adapted to be struck by cams $A^7$, $A^8$ when it is desired to raise or lower the warps to form sheds. The cams shown will open the sheds for plain weaving, but this invention is not limited to plain weaving, as the sheds may be controlled and opened in any usual manner, according to the particular weave desired for the body of the fabric. The loom frame is provided with a warp beam B from which the warp $b$ is led over a suitable warp roll B' and thence to and through usual eyes in whatever heddles are carried by the harness frames, and thence between the dents of the usual reed $b'$. In the present instance of my invention the reed is shown as carried by a batten $B^2$ mounted at its upper end on a shaft $B^3$, but it will be understood that instead of the particular batten or reed I may employ any other usual form of reed carried by a lay mounted in the loom in any usual style. The woven cloth $b^2$ is led over the breast beam $b^4$ and is taken care of by any usual take-up mechanism common to looms. The main shaft $A^{10}$ of the loom sustained in suitable bearings has connected thereto by a spline part of a clutch pulley C, shown as having a cone surface to engage a cone surface of a coacting clutch member C' loose on said shaft and driven by a belt. The hub of the fast member C of the clutch is represented as provided with an annular groove that is entered by a pin $c$ at the lower end of a clutch-moving lever $C^2$ mounted at $C^3$ on a suitable stand projecting from the loom side.

The upper end of the clutch-moving lever is slotted at $c'$ and is engaged by a link $c^2$ connected with the shipper lever $C^4$, said lever having at its upper end the usual handle and having at its lower end a spring that is connected with the loom end in any usual manner. The shipper handle is made movable in a shipper handle guide plate $C^5$, it having the usual slot and side notch, the shipper being held in its working position when in the notch, and when released, as will be hereinafter described, the spring of the shipper handle actuates the clutch-moving lever $C^2$ to release the clutch by sliding the fast part in the direction of the arrow Fig. 1, thus stopping the shaft. The main or cam shaft is provided with a bevel gear D that in turn engages a bevel pinion D' fast on a shaft $D^2$ provided at its front end with an eccentric $D^3$ having cut in at both its rear sides a like cam groove $D^4$, said groove receiving each a roller or other stud $D^5$ of a forked block $D^{5\times}$ connected to the end of a link $D^6$ jointed at $D^7$ to a lever $D^8$ having its fulcrum at $D^9$, said lever having jointed to its upper end a link $D^{10}$ that in turn is connected to the foot $d'$ of the weft-carrier. The foot projected forwardly therefrom or to the left, viewing Fig. 1, has a lower member $d^2$, while an upper member $d^3$ is pivoted thereto at $d^4$, said upper member having at its outer end an inclined heel $d^5$, a notch $d^6$ and a beveled faced toe $d^7$.

Figs. 18 and 19 show the weft-carrier enlarged. Each member of the carrier has its inner end, see Fig. 20, so shaped as to present acting faces 2, 3 between which to grasp the weft, and at its side edges each member has blades 4, 5 to form a weft cutter, the blades of the cutter being at that side nearest the fell of the cloth.

A suitable spring 7 is interposed between the two members of the weft-carrier back of the joint $d^4$ and serves normally to keep the acting ends of the carrier closed. The foot $d'$ of the carrier is dove-tailed in cross section, see Fig. 3, and is free to be slid longitudinally in a groove of a track $D^{15}$ suitably sustained from the loom frame, the length of the track and of the carrier being sufficient to enable the carrier to be entirely withdrawn from the warps used in the shed, and to be projected entirely through and beyond the farthest warp thread at the farthest side of the shed.

As the weft-carrier is thrust through the shed to engage a weft, the beveled toe $d^7$ meets the end of a dog 20, see Fig. 2, mounted on a vertical stud 21, and the outer end of the upper member of the carrier is depressed to thus open the inner ends of the nippers that they may pass over whichever weft thread is to be seized and drawn into the shed at the next backward movement of the weft-carrier, and just as the shoulder at the right of the toe passes under the end of the dog, the spring 7 immediately raises the outer end of the carrier, closing its inner end on to the weft to be engaged, and at the same time the cutting mechanism of the weft-carrier cuts the weft so engaged between the point where the carrier engages the same and the selvage to which the free end of the weft is connected by hand, or otherwise, when about to commence weaving. After the weft-carrier has engaged a weft and has been started backwardly toward the right in Fig. 1, the shoulder of the toe $d^7$ meets the dog 20 and turns the same against the spring 22 so that the dog does not again open the carrier, but as soon as the carrier reaches its back stroke and a weft has been drawn into the shed, the incline $d^5$ of the heel of the carrier meets a releasing device 23 that immediately depresses the outer end of the upper member of the carrier and releases the weft. This is repeated after each operation.

Just prior to releasing the weft drawn into the shed, the reed strikes the weft and beats it into the fell. The reed derives its movement from a lever E pivoted at $E^8$, said lever being united by a link $E^2$ with the reed-carrier, said lever having a roller or other stud 25 that enters a cam groove 26 in the outer sides of cams 27 fast on the main shaft, there being two levers E, each having its own stud and cam.

In the operation of the loom, about one-fourth of the cycle is taken up in the movements of the harness and of the reed, and about three-fourths of the cycle in actuating the weft-carrier as it will be understood that the shed must be held open as long as possible to enable the weft-carrier to pass through a shed, seize a weft and draw the same backwardly through the shed. The main shaft at the left side of the loom has a gear $E^4$ that engages a pinion $E^5$ having a crank pin $E^6$. This crank pin has connected with it a link $E^7$ that in turn is jointed to a bell crank lever $E^8$ forming part of the take-up mechanism not herein claimed and therefore not specifically described. The crank pin $E^6$, however, carries a second link F on which is mounted a spring $F^2$, the upper end of the rod above said spring being extended through an arm of a lever $F^3$ pivoted at $F^4$ and constituting a carrier for the pattern mechanism $F^5$ which is shown as a barrel having ratchet teeth that are engaged by a hooked pawl $F^6$, each time that the pattern barrel is moved to the left, viewing Fig. 1, said barrel being made in any usual manner and having either cards or projections to actuate in the proper direction and the proper times the weft presenters to be described. The rod F has connected to its upper end a collar $F^7$ that, when the rod is lowered, moves the pattern surface outwardly and revolves the same to bring a new line of indication into operative position. The spring $F^2$ when the rod is raised moves the pattern surface toward the loom side, yielding so as not to cause any breakage in case of an accident, or if the movements of the weft presenters were obstructed in any way.

In the loom herein to be described I may use one or more wefts, the wefts being of different color or character. I have herein shown provision for handling four wefts, which may be considered as of different colors, as $e$, $e'$, $e^2$, $e^3$. These weft presenters have enlarged ends or heels 27 that, when they contact with an unperforated part of, for instance, a jacquard 28 carried by the pattern surface, will be thrust outwardly, as represented, by the presenter $e^3$ into its operative position, while all the other presenters will enter a hole in the jacquard and a hole in the pattern cylinder, and be maintained in their inoperative positions.

Viewing Fig. 6, the different warps for the presenters $e$, $e'$, $e^2$, $e^3$ are taken respectively from bobbins 29, 30, 31 and 32, each one containing many thousands of yards of weft. Each thread is led from its bobbin through like stationary guides 33, see Fig. 6, full lines, and Fig. 5 dotted lines, thence through an eye in the upper end of a drop device 34 pivoted at 35 and having its short arm provided with a hook 36. From the hole in the upper end of the drop device each weft is led to and through a hole in the inner end of its respective weft presenter, and viewing Fig. 6, the thread coming from the bobbin 32 is led through an eye of the presenter $e^3$ and the latter is shown as occupying its operative position. The free ends of the weft threads extended through the eyes of the remaining thread presenters are connected with the selvage warp next them, and this may be done by hand by winding a portion of the free end of each weft about one or more of the warps.

Referring to Fig. 6, the thread from the bobbin 32 occupies its operative position, and as the nipper is moved forwardly through the shed and is opened, the open end of the nipper is passed over the weft thread next to be taken thereby, it occupying a position nearly parallel with the warp thread, and the carrier having embraced said weft, is closed thereon quickly, as described, by its spring ready to start back, and it will be observed that the cutters of the weft carrier, see Fig. 6, as the latter close on the weft also cut the weft between the point where the weft-carrier engages the same and the fell of the cloth.

Each weft, so long as it is unbroken, retains the hooked end 36 of the drop device in its elevated position, but in case the weft breaks the hooked end of the said drop device being the heavier descends and is caught by the hook 40 of a vibrator 41 pivoted at 42 and moved to and fro through its connection by a rod 43 with the reed-moving lever E, said hooked end being moved outwardly or toward the rear of the loom at each pick if the weft is unbroken. If a weft is broken, the hooked end of the drop device will drop behind the acting hook of the vibrator when the latter is moved into its forward position, or toward the fell of the cloth as the reed beats the weft into the fell, and as the reed is moved backwardly the drop device holds the vibrator in its dotted line position, Fig. 3, in which position the outer end of the vibrator is out of contact with the stop latch G pivoted at G', permitting the inner heavier end of said stop latch, it having a hook, to drop that it may be engaged by one of the arms G² connected with a revoluble disk G³ fast on the cam shaft, moving in the direction of the arrow thereon, Fig. 3, pulling the brake G³ˣ pivoted at G⁴ against the periphery of said disk to aid in stopping the loom, and at the same time moving forwardly in a rod G⁵ sliding in a suitable guide G⁶ so that the free end of said rod meets the inner side of the shipper handle, knocks the same out of its notch and lets the shipper handle be moved so that through the connection c² with said lever C² before described, the clutch pulley of the actuating means will be released.

The warp threads are separated by usual lease rods and the warp between one and the next lease rod is crossed. Each pair of warps has coacting with it between the lease rods a drop device 50 in every particular like the drop device 34 hereinbefore described, with the exception that the drop device 50 is not provided at its upper end with a hole for the reception of the warp, but on the contrary the drop devices 50 are maintained in their inoperative positions with their hooks out of the path of movement of the vibrator hook 40 by the contact of their upper right hand edges with the warps when crossed, and in case the warp breaks a drop device is free to turn so that the hooked end thereof, which is made the heavier overbalances the drop device and permits it to drop and be engaged by the vibrator to effect the stopping of the loom, as before described.

This invention is not limited to the exact shape or configuration of the drop devices or the vibrators.

In mounting the warps in the loom, I provide for more warps than I intend to use in the finished fabric; that is, referring to Fig. 12, showing a part of the fabric with the threads opened up, I have shown three warp threads 51, 52, 53 supposed to be duplicated at opposite selvages, which are more than I intend to retain in the finished cloth. In addition to the warps mentioned, I have herein chosen to illustrate four other warp threads 54, 55, 56 and 57 to form a selvage. The warp threads 51, 52 and 53, together with the weft, interlaced therewith and extended beyond the edge warp thread 54, which is to remain in the fabric, are removed while the cloth is being woven by means of a disk cutter 58, see Figs. 2ª and 3, there being two such cutters one arranged outside of the outer warp threads 54 of the selvage. These cutters are mounted on a shaft 59 deriving rotary movement from a belt 60 extended over a pulley on said shaft and over another pulley 61 on the main shaft.

It is essential, it will be understood, that the wefts be so interwoven with the selvage warps that the fabric removed from the loom, may be handled throughout its finishing operations and while being marketed without the warp and weft becoming displaced. To insure this I have herein provided for binding the wefts to four warp threads 54 to 57 by means of an independent or auxiliary warp 63 which may be of the same size or smaller, which will be controlled and moved by any usual form of doup heddle; that is, a heddle so moved as to move the warp thread 63 so that it will embrace one or another of either of the four warp threads 54 to 57.

I have herein shown the warp thread 63 as being passed under weft 68 and over the warps 57, 56, 55, and 54, thence back under all of said warps and over the parallel weft thread 67, thence under the warp threads 57, 56, 55 and 54, back over the same and under the parallel weft thread 66, as clearly shown in Fig. 12. When this extra warp 63 handled, as described, is beat into the fell with the weft threads, the weft and warp at the selvage are so thoroughly interlocked that they will remain so in all conditions of the woven fabric.

I will now describe a novel form of doup heddle that I have found most desirable in the formation of the selvage, it being understood that the doup heddle mechanism is duplicated at each selvage.

Referring to Fig. 8, 150 represents a stationary arm connected with the loom side and having at its outer end a plate connected by screws 151 with the back plate 152 of a raceway H shown in detail in Figs. 9 to 11, said raceway having at its upper and lower ends suitable rollers $h$ over which pass upwardly a flexible connection $h'$ and two flexible connections $h^\times$, said connections carrying an eye $h^2$ through which is extended the auxiliary warp thread 63, the upwardly led end of the connection being attached in any suitable manner at $h^3$ to a pulley $h^4$ connected with the harness-sustaining shaft A². The downturned connections $h^\times$ will be attached to any suitable springs so that as the pulley $h^4$ is revolved back and forth the connections will be drawn about the raceway H over the rollers h, taking the eye h² from its full line position in the direction of the arrow Fig. 11 into the dotted line position said figure, the eye being moved for more than a complete rotation about the raceway.

The arm 150 has a pin 153 on which is mounted, as herein shown four like levers 154, each one having connected with it a spring 155 that normally keeps the free end of said levers elevated in the space of the raceway. The free end of each of these levers has a hole for the reception respectively of the warp threads 54, 55, 56 and 57, and these levers are moved in pairs in opposite directions just as the harness frames are moved by connections 156, 157 extended over guide rollers 158, 159 and connected with the shaft A³ so that it will be understood that the levers 154 move the warps carried by them up and down and form sheds between them in the same order as the warp threads handled by the heddles of the harness frames and as distinctly shown in Fig. 12. The warp threads carried by the levers 154 and the thread 63 are all led through the same space between two dents of the reed.

It will be understood that whenever a connection h' is actuated so that its heddle-eye h² traverses or encircles the raceway, the thread 63 carried in the heddle-eye h² will pass under the series of warp threads carried by the levers 154 and then above, over and down to get under the weft thread that is then coming through the shed, as shown in Figs. 15 and 16.

Having described my invention, what I claim as new and desire to secure by Letters Patent is:—

1. In a loom, a pattern-controlled weft-presenting device located at one side of the selvage, a weft-carrier, and a weft cutter movable therewith, located normally outside the opposite selvage, combined with means to project the weft-carrier and weft cutter through the shed to take a weft from said presenting device, and means to operate the weft cutter simultaneously with the taking of a weft by the weft-carrier.

2. In a loom, a plurality of pattern-controlled weft-presenting devices located at one side of the selvage, a weft carrier adapted to be reciprocated through the shed toward and from said weft-presenting devices, and a weft cutter mounted on the weft-carrier, combined with means for projecting the latter through the shed to engage the weft presented by either of said weft-presenting devices, and means to open and close the weft-carrier and simultaneously open and close the weft cutter.

3. In a loom, a weft-presenting device located near one selvage, and a weft-carrier located normally outside the opposite selvage and provided with a weft cutter, means for projecting said carrier through the shed, means to then open the weft-carrier that it may embrace a weft leading from a weft-presenting device to the selvage, and means to then close the weft-carrier to grasp the weft and cut the same between the point where the carrier grasps the weft and the fell of the cloth being woven prior to retracting said weft carrier.

4. In a loom, a weft-presenting device, a weft-carrier provided with a weft cutter, said weft-carrier comprising two arms, a spring acting normally to close the arms to hold a weft, and means to move said carrier to and fro across the shed, combined with means for temporarily opening said carrier to grasp a weft at the completion of its stroke through the shed toward the weft-presenting device, and again at the completion of its withdrawal from the shed with a weft, the spring acting to close the arms and grasp the weft and to cause the weft cutter to simultaneously cut the weft immediately after the first-mentioned temporary opening of said arms.

5. In a loom, a weft-presenting device, a two-armed weft-carrier, one of said arms having its extremity beveled, a guideway to sustain said carrier, and a spring acting normally to maintain the beveled end of said arm elevated, combined with a device to contact with the beveled part of said arm at the completion of its backward stroke to open said carrier.

6. In a loom, a weft-presenting device located near one selvage warp, a weft-carrier presenting two arms, one pivoted on or with relation to the other, the upper one of said arms having its outer extremity beveled and near said bevel a beveled toe, and a spring acting normally to keep the free ends of said arms closed, combined with means to move said carrier through the shed toward the weft-presenting device and to retract the same from the shed, and with means for opening the carrier on its arrival at the weft-presenting device to grasp a weft and to again open said carrier after its withdrawal from the shed to release the weft.

7. In a loom, the following instrumentalities: a weft presenting device located at one selvage, a weft-carrier having a weft cutter located normally outside the opposite selvage, means to move said weft carrier through the shed toward the weft presenter, and to then withdraw said carrier from the shed, a spring acting normally to close said weft-carrier, means to open said carrier temporarily on its arrival near said weft-presenting device that it may engage a weft, said spring immediately thereafter acting to close the carrier and cut the weft, means to again open the carrier as it retires from the shed on its back stroke, and mechanism for manipulating a warp thread to embrace other warp threads and the weft laid by the weft carrier to form a selvage.

8. In a loom, the following instrumentalities: a weft presenting device located at one selvage, a weft-carrier having a weft cutter located normally outside the opposite selvage, means to move said weft carrier through the shed toward the weft presenter, and to then withdraw said carrier from the shed, a spring acting normally to close said weft-carrier, means to open said carrier temporarily on its arrival near said weft-presenting device that it may engage a weft, said spring immediately thereafter acting to close the carrier and cut the weft, means to again open the carrier as it retires from the shed on its back stroke, heddle mechanism for manipulating a warp thread to embrace other warp threads and the weft laid by the weft carrier to form a selvage, and means for cutting the fabric in the direction of its length outside the selvage warp to be retained in the fabric.

9. In a loom, the following instrumentalities: a weft presenting device located at one selvage, a weft-carrier having a weft cutter located normally outside the opposite selvage, means to move said weft carrier through the shed toward the weft presenter, and to then withdraw said carrier from the shed, a spring acting normally to close said weft-carrier, means to open said carrier temporarily on its arrival near said weft-presenting device that it may engage a weft, said spring immediately thereafter acting to close the carrier and cut the weft, means to again open the carrier as it retires from the shed on its back stroke, and means for stopping the loom when the weft or warp break, said means including a drop device intermediate the weft-presenting device and the weft supply, the weft passing through an aperture in the drop device.

10. In a loom, a weft carrier having a beveled toe at a distance from its weft-engaging portion, a spring acting normally to close the weft engaging portion of said carrier, a pivoted dog, located outside the selvage, means to move said carrier into and across the shed, said dog at such time coacting with said beveled toe to open the weft-engaging portion of the carrier, said dog turning about its pivot on the back stroke of the carrier and being rendered inoperative for opening the carrier on such stroke.

In testimony whereof, I have signed my name to this specification, in the presence of two subscribing witnesses.

FRANCESCO TAVELLA.

Witnesses:
GEO. W. GREGORY,
H. CHIARIGLIONE.